United States Patent [19]

Distin, Jr.

[11] Patent Number: 4,604,916
[45] Date of Patent: Aug. 12, 1986

[54] EPICYCLIC TRANSMISSION HAVING CAM DRIVEN ROLLER RETAINER

[75] Inventor: Robert G. Distin, Jr., Louisville, Colo.

[73] Assignee: Advanced Energy Concepts '81 Ltd., Boulder, Colo.

[21] Appl. No.: 578,929

[22] Filed: Feb. 10, 1984

[51] Int. Cl.$^4$ ............................................. F16H 1/34
[52] U.S. Cl. ...................................... 74/805; 74/465; 74/797; 74/804
[58] Field of Search ................... 74/804, 805, 63, 202, 74/465, 801, 797

[56] References Cited

U.S. PATENT DOCUMENTS

| | | |
|---|---|---|
| 1,767,866 | 6/1930 | Wildhaber ............................ 74/804 |
| 1,831,577 | 11/1931 | Richer ................................. 74/804 |
| 1,867,492 | 7/1932 | Braren ................................. 74/804 |
| 4,023,440 | 5/1977 | Kennington et al. ................ 74/804 |

FOREIGN PATENT DOCUMENTS

| | | |
|---|---|---|
| 1750279 | 3/1971 | Fed. Rep. of Germany ........ 74/804 |
| 991088 | 1/1983 | U.S.S.R. ............................... 74/804 |

Primary Examiner—Lawrence J. Staab
Assistant Examiner—Dwight G. Diehl
Attorney, Agent, or Firm—Sughrue, Mion, Zinn, Macpeak, and Seas

[57] ABSTRACT

An epicyclic speed reducing transmission having first and second sets of conjugate epitrochoidal and hypotrochoidal races and first and second sets of rollers transmitting torque between respective sets of races includes a retainer structure for the first and second sets of rollers. The retainer structure is apertured so as to receive the rollers, and independent retainer elements for each set of rollers are provided, with both of these elements being conjointly orbitally driven. The retainer structure may be positively orbitally driven by means of a cam driven spider provided either centrally of or externally of the pair of epitrochoidal races.

17 Claims, 14 Drawing Figures

EPICYCLIC TRANSMISSION HAVING CAM DRIVEN ROLLER RETAINER

BACKGROUND OF THE INVENTION

The present invention relates to a speed reducing mechanism of the epicyclic type having two sets of conjugate epitrochoidally and hypotrochoidally shaped gears or races with first and second sets of rollers disposed between conjugate pairs of races for transmitting torque therebetween. One of the races, typically the hypotrochoidal race of the first set, is restricted from rotating to thereby form a stator member.

Epicyclic transmissions of this type have been previously developed by the present inventor. In particular, the gearing mechanisms disclosed herein are related to those disclosed and claimed in U.S. Ser. No. 362,195, commonly assigned, the disclosure of which is hereby incorporated by reference.

As disclosed in that application, the rollers of an epicyclic transmission of this type generally circulate with respect to a central axis of the gear mechanism. As viewed from this axis, the center of the circle defined by the rollers appears to rotate or revolve thereabout.

In view of the complex, conjoint movement of the rollers of each set, it has been found desirable to provide some sort of retainer mechanism to guide the rollers in their movement. The above noted U.S. application Ser. No. 362,195 discloses a general type of retainer mechanism which is generally comprised of simple circular disks which are apertured to receive ends of the rollers. Commonly assigned applications Ser. Nos. 578,931, 578,932 and 578,933 entitled "Two-piece Retainer For Epicyclic Transmission", "Pin Controlled Retainer For Epicyclic Transmission", and "Two-Piece Retainer For Epicyclic Transmission", respectively, the disclosures of which are hereby incorporated by reference, disclose various other retainer mechanisms which have been found effective in controlling the rollers of transmissions of this type. However, it has been found that in some cases, epicyclic drives have been found to perform better if the roller retainer is more positively controlled. That is, in the past, the retainer has generally been a "passive" element, i.e., it has not been directly driven by either the input or the epitrochoidal gears.

The present invention represents, in part, a departure from the use of the previously employed "passive" retainer elements. In an epicyclic transmission according to the invention, the retainer may be positively driven by means of cam elements or the like typically arranged on the input shaft of the device.

SUMMARY OF THE INVENTION

As indicated, the present invention relates to an epicyclic transmission employing a roller retainer which may itself be a directly driven element. It has been found by the present inventor that the performance of epicyclic transmissions of the present type may be improved by using the inherent geometry of the same to advantage by providing a means, typically on the input shaft of the device, for driving the retainer mechanism as a cam follower. Similarly, improvements may be realized by merely orbitally linking a pair of retainers. In this manner, the retainer mechanism is more positively controlled, resulting in a smoother drive.

Thus, it is an object of the present invention to provide an epicyclic transmission of the type employing rollers as rolling torque transmitting elements with a retainer mechanism which includes at least a portion in contact with a central cam mounted on the input shaft of the transmission.

It is a further object of the invention to provide a retainer mechanism which includes a pair of orbitally linked retainers, to provide a smoother drive without the use of a retainer driving cam.

Depending upon the particular gearing arrangement, the form of the retainer may vary, and it is the purpose of the following detailed description to set forth various modes of effecting the above stated objects.

BRIEF DESCRIPTION OF THE DRAWINGS

The present invention will now be described in more detail, with reference to the following detailed description taken in conjunction with the accompanying drawings, in which.

DETAILED DESCRIPTION OF THE PREFERRED EMBODIMENTS

Figure 1:
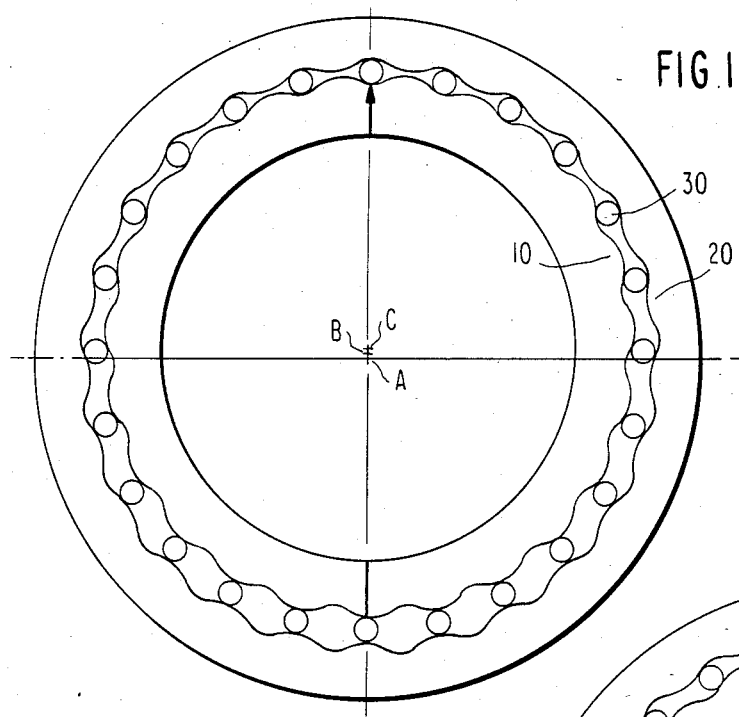
FIG. 1 illustrates a simplified anti-friction drive of the epicyclic type, showing the starting positions of the various elements thereof.
Figure 2:
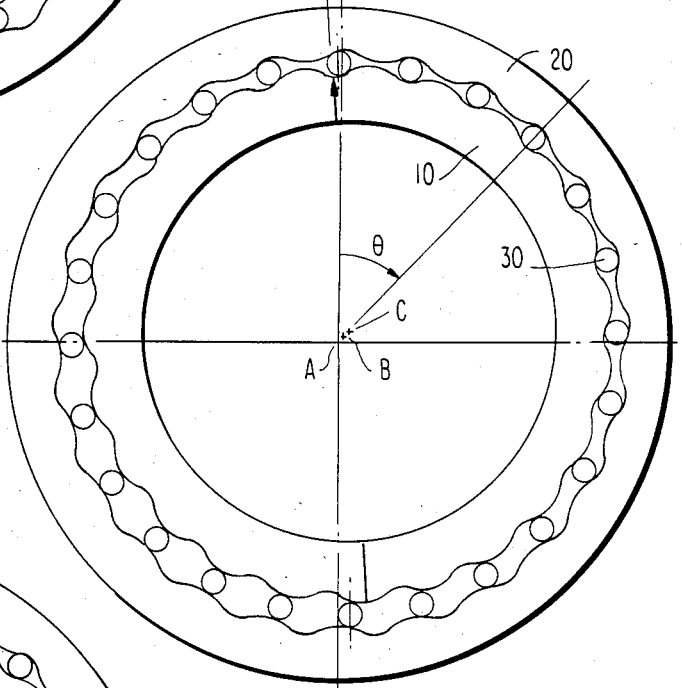
FIGS. 2 and 3 show the system of FIG. 1 as it moves through an increasingly large drive angle.

In order to provide a proper background for the discussion which follows, the geometry of a typical epicyclic transmission of the rollingly engaged roller type will first be described. Referring first to FIG. 1, a typical pair of conjugate epitrochoidal and hypotrochoidal races are depicted, with a set of rollers rollingly transmitting torque therebetween. In operation, the epitrochoidal gear element 10 is cam driven by an input shaft having a cam thereon so that it orbits about the central axis of the gearing according to the eccentricity of the cam. A hypotrochoidal race or ring 20 is typically employed as a stator element, an epitrochoidal race or ring 10 is employed as an orbiting, rotary element and a set of rollers 30 are rollingly entrained therebetween. The particular set of FIG. 1 employs an epitrochoidal ring having 23 lobes, a hypotrochoidal ring having 25 lobes, and 24 rollers. The cam throw or eccentricity is about ⅛ of an inch. The center of the transmission and the center of the hypotrochoidal (stator) ring is at the point marked A. The center of the circle defined by the rollers 30 is at B and the center of the orbiting epitrochoidal ring is at C. As indicated above, as the input cam shaft is rotated, the epitrochoidal race 10 will be caused to orbit about the system center A. FIG. 2 shows the system of FIG. 1 after the driving cam has rotated through an angle of about 43°. The epitrochoidal race 10 accordingly moves through an angle defined by the following formula:

$$\phi = \theta(1 - N_1/N_2) \quad (1)$$

where:
 $\theta$ = the cam angle (here, 43°)
 $N_1$ = the number of lobes on the hypotrochoidal race,
 $N_2$ = the number of lobes on the epitrochoidal race, and
 $\phi$ = the rotational angle of the epitrochoidal race.

With the values given above, if $\theta = 43°$, then $\phi = -3.7°$. The minus sign indicates that the direction of movement of the epitrochoidal race is in the direction opposite the input rotation (the direction of rotation of the cam).

Figure 3:
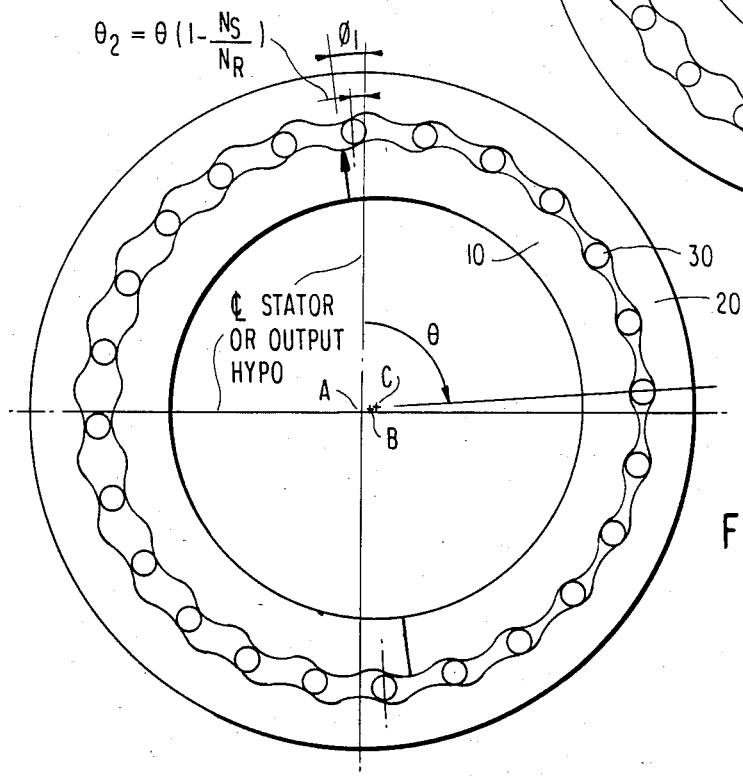

FIG. 3 shows the same system after moving through a cam angle of about 86°. The counterclockwise movement of the epitrochoidal member 10 and the set of rollers 30 has become more pronounced. As is obvious from this Figure, the system of rollers rotates through an angle which is different from that of the epitrochoidal race 10. From FIG. 3, it can be readily be determined that the roller system moves through an angle defined by the following equation:

$$\phi_2 = \theta(1 - N_1/B_2) \quad (2)$$

where:
 $B_1$ = the number of rollers
For the rotational angle of 86° shown in FIG. 3, $$\phi = -7.5°, \text{ while } \phi_2 = -3.6°.$$

Even though the system of rollers rotates through a different angle than the epitrochoidal race for a given cam angle, it is clear from FIG. 3 that the centers of the rollers and the epitrochoidal race orbit together. That is, the points A, B and C are always in a straight line. The center of the circle defined by the rollers orbits the transmission axis at a radius $\overline{AB}$, while the epitrochoidal race rotates about this axis at a radius $\overline{AC}$. Thus, even though the epitrochoidal member rotates through a different angle, and at a different speed than the system of rollers, a common relationship exists with respect to both of these members and the input cam. That is, a predetermined angular relationship is established among the moving elements.

The present invention is designed so as to take advantage of the above-described geometrical relationship between the centers of the hypotrochoidal race, the epitrochoidal race, and the set of rollers. By providing a cam similar to the cam which drives the epitrochoidal race or races, but which is centered on the point B, an excellent means for retainer control may be designed in the form of a cam follower.

Figure 4:
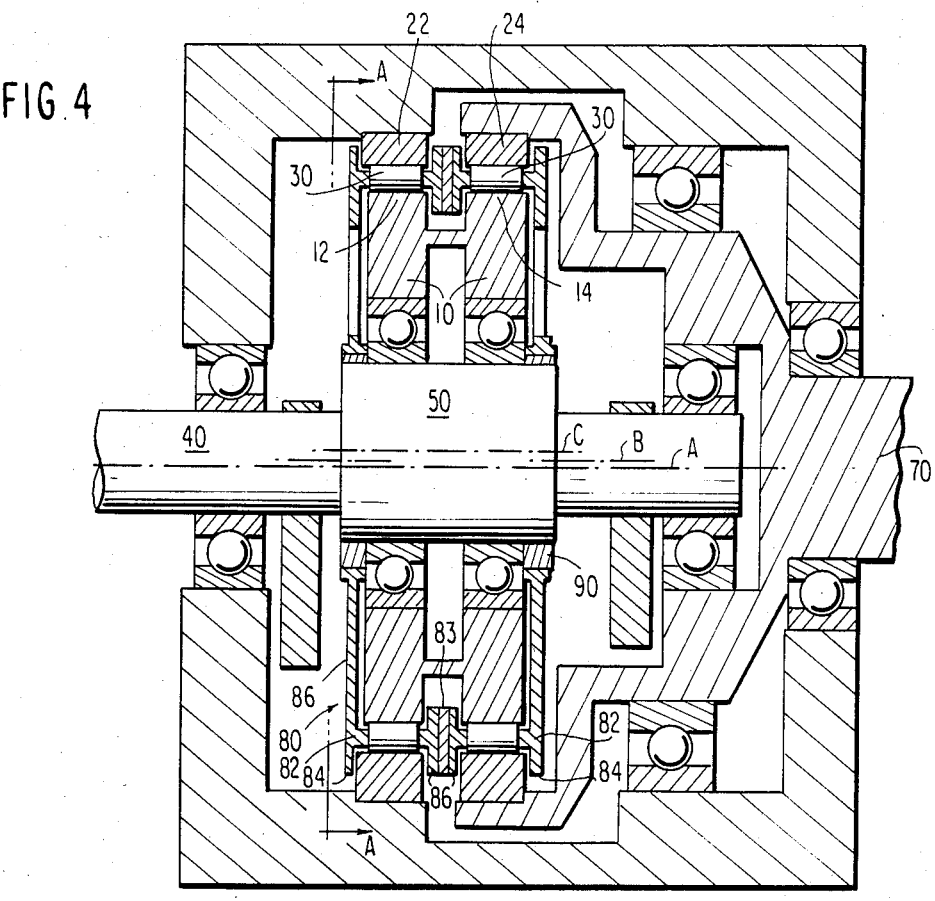
FIG. 4 illustrates a first embodiment of the retainer assembly according to the invention.

FIG. 4 shows the construction of a first embodiment according to the present invention. The transmission mechanism per se of this embodiment is not believed to require substantive description. However, briefly, the rotation of an input shaft 40 is converted into the orbital motion of epitrochoidally shaped gear elements 10 by way of a cam 50. The cam has an eccentricity equal to the distance between the axis A and the line C depicted in the drawing. The epitrochoidal member 10 is formed generally in the shape of an "H" in cross section, and includes a pair of gear surfaces 12 and 14. The left-hand gear surface 14 is formed with substantially trochoidal curvature, as is the coacting, conjugate gear element (hypotrochoid 22, which in this embodiment is employed as a stator). These two elements 12 and 22 are of course in engagement with one another through the intermediary of rollers 30. The second gear face 14 is also of epitrochoidal curvature, and is in engagement with an outer hypotrochoidal output race 24 by way of a second set of rollers 30. Both hypotrochoidal-epitrochoidal gear sets 22, 12; 24,14 are provided with conjugate curvature, which means that the curvature of these two surfaces are related in such a way that the rollers 30 will be in substantially continuous contact with both surfaces. One method of producing conjugate trochoidal surfaces is taught in copending patent application Ser. No. 313,442, commonly assigned.

The gear mechanism of FIG. 4 is completed by an output member 70, which is fixedly connected to the second hypotrochoidal race 24.

Figure 5:
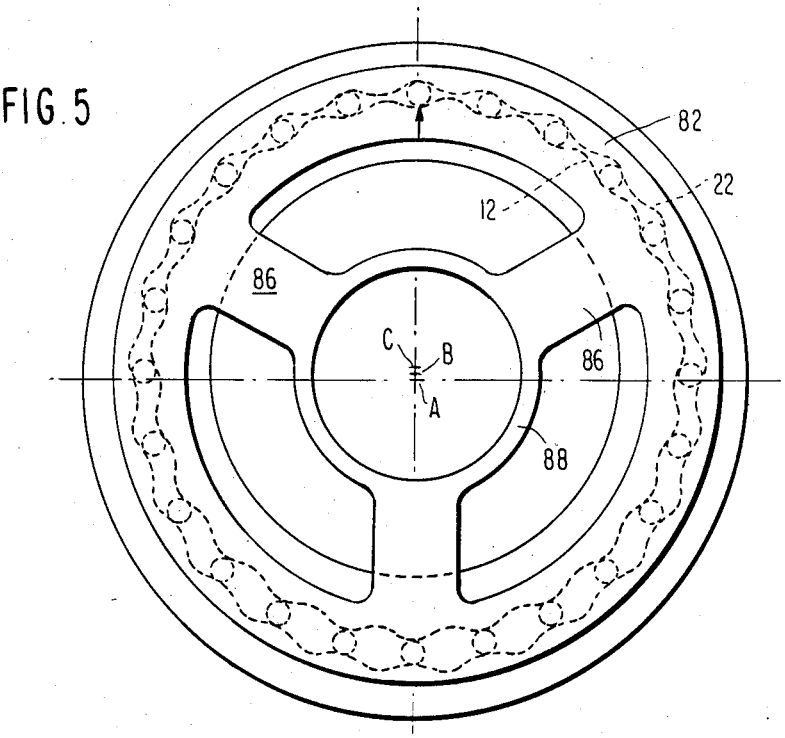
FIG. 5 is a view taken along line A—A of FIG. 4.

The two sets of rollers 30 are provided with a retainer structure 80. As seen in FIGS. 4 and 5, the retainer structure 80 includes left- and right-hand retainers proper 82 which are formed with apertures for the various rollers 30. Each retainer proper 82 has a pair of side flanges 84, 86 and the flanges 86 are separated by a bearing or bushing 83 so as to permit relative rotation of the two retainers. Each retainer proper 82 is provided with a spider section 86 having multiple legs or spokes, and a central annular ring separately denoted by 88. As can be seen more easily in FIG. 5, the retainer structure is centered at the point B, similarly to the roller circle center.

Additional cams 90 centered on axis B in FIG. 4 are used to impart the driving force to the retainers 82. Stability is achieved by providing two identical cams 90, and by abutting the flanges 86 via the bushing 83. At the interface between the cams 90 and the circular rings 88 of the retainer structure there is provided either a bushing or a bearing, as there is obviously relative motion between these two elements. If desired, bearings of the type illustrated for the cam 50, but smaller, may be used between the rings 88 and the cams 90.

Figure 6:
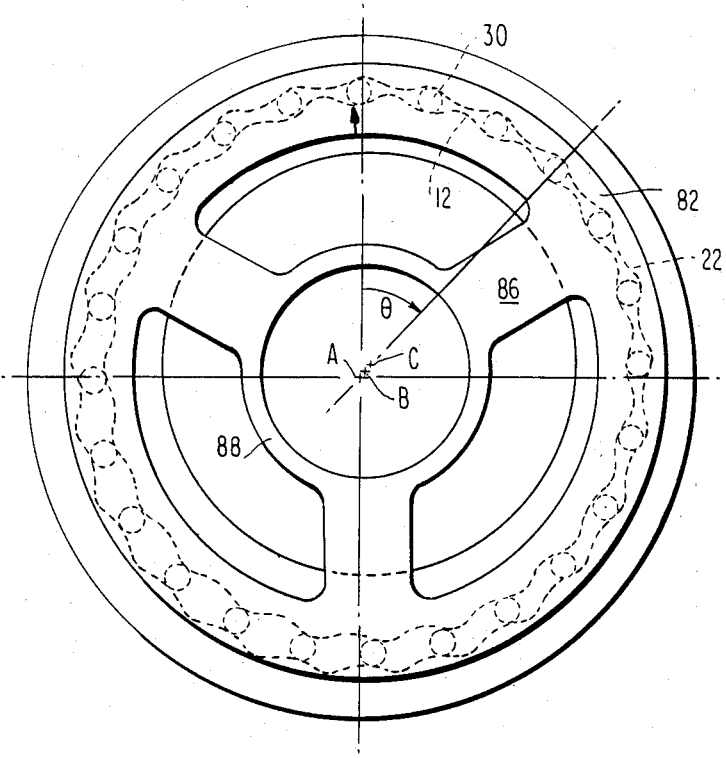
FIGS. 6 and 7 are views similar to FIG. 5, but showing the retainer as it is driven through an increasing drive angle.
Figure 7:
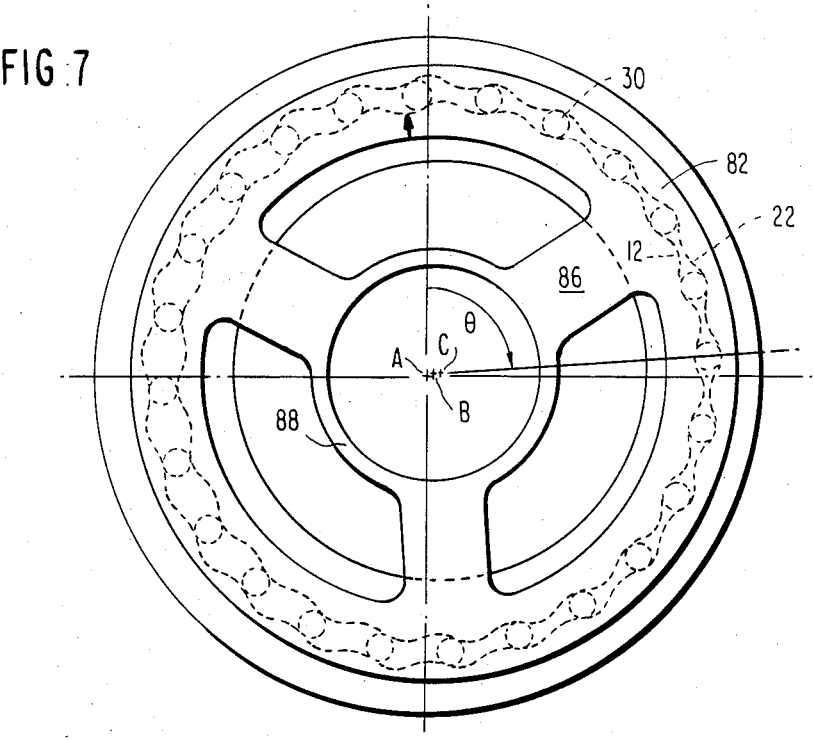

FIGS. 5–7 are views similar to FIGS. 1–3, but including the retainer mechanism and showing the motion which it undergoes as the cams 50 and 90 are rotated by way of the input shaft. As the retainer mechanism is centered on the point B, the motion which it undergoes at its periphery is the same as is experienced by the circle of rollers 30. Thus, the retainer can properly control the rollers and is not itself subject to random motion which can occur in the case of non-driven retainers.

A second embodiment of the present invention is shown in FIGS. 8–11. The retainer device according to this embodiment varies from that of the previous embodiment in two key points. In particular, the spider structure of the retainer of the second embodiment is provided between the two epitrochoidal gears 10, so that the retainers proper 82 are centrally supported and only one driving cam 90 is required. Secondly, the spider 86 is formed independently of the retainers proper 82 and is allowed to rotate with the epicyclic gears 10 by contacting pins 95 extending between the two parts 10 of the epitrochoidal gear.

The second embodiment is advantageous in a number of respects. Particularly, since only one spider member 86 and cam 90 are required, the construction is simplified by as much. Additionally, space and cost savings may be realized. As the spider is driven rotationally by the epitrochoidal gear, the rollers 30 are therefore relieved of this burden.

Figure 8:
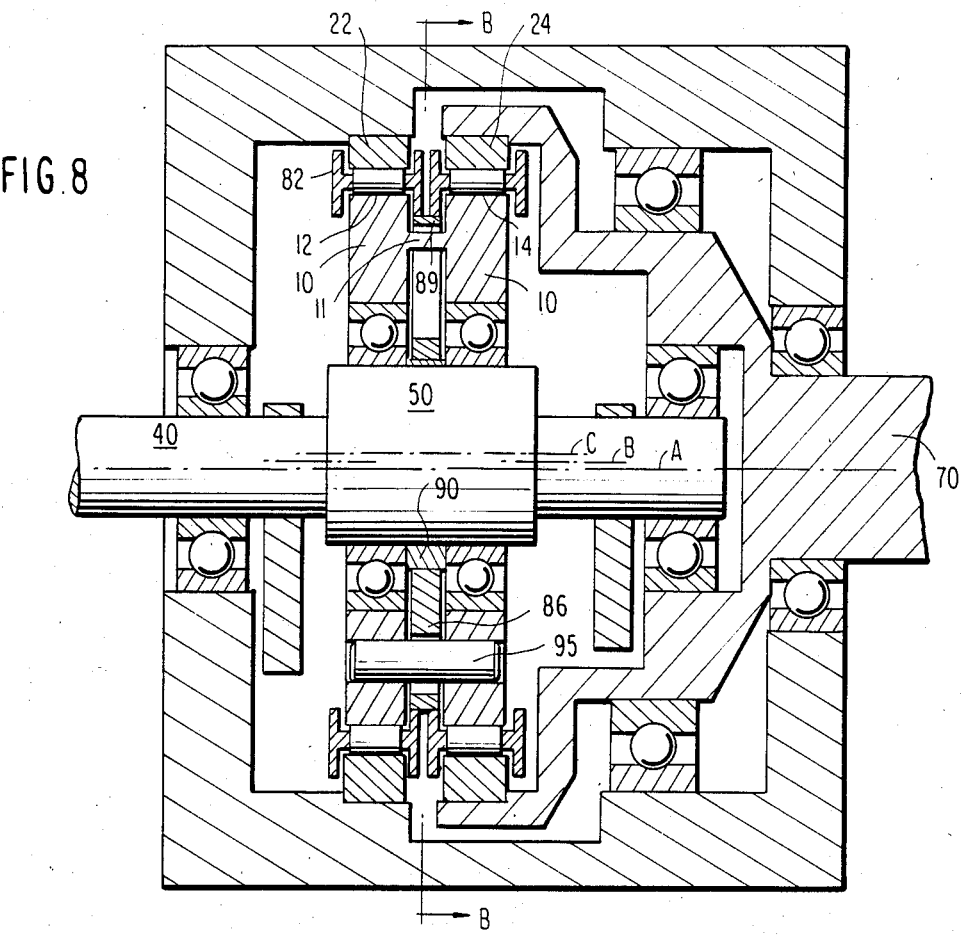
FIG. 8 illustrates a retainer system according to a second, presently preferred embodiment of the present invention.
Figure 9:
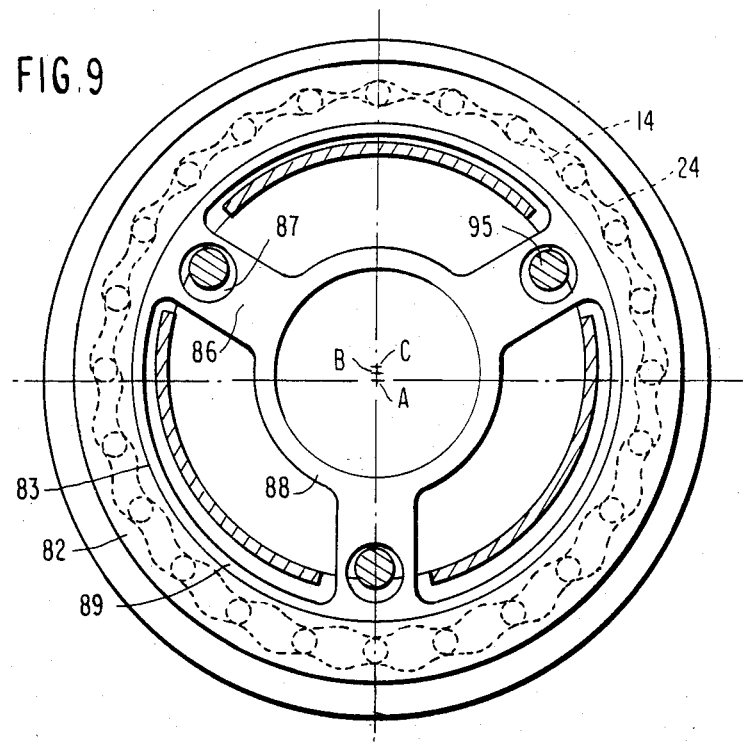
FIGS. 9-11 represent views taken along line B—B of FIG. 8, and show the retainer as driven through an increasing angle.

Referring now to FIGS. 8 and 9, the spider member 86 includes a single central annular ring 88 which is centered along the axis B in FIG. 8. The spider also includes an outer annular ring 89 which bears against inner annular surfaces of the retainers proper 82. The interface between the retainers proper 82 and the ring 89 is denoted by 83, and a bushing or bearings are provided at this interface. A bushing or bearings are of course required since the retainers proper rotate at the speed of their respective set of rollers 30, while the spider member rotates at the speed of the epitrochoidal gear 10.

Figure 10:
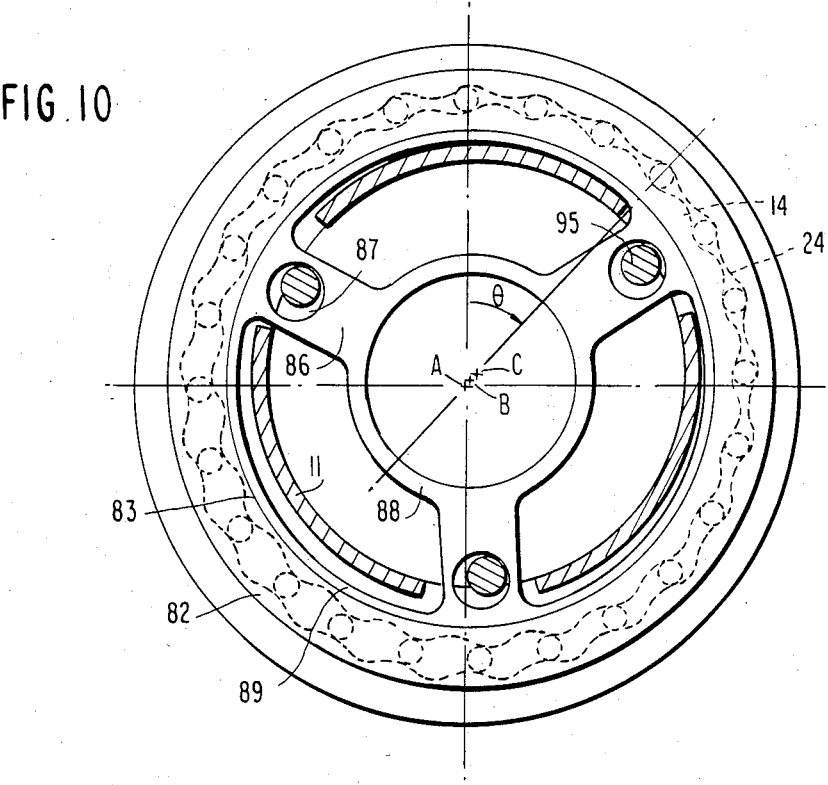

The manner of connection between the epitrochoidal race 10 and the spider is best seen in FIGS. 8 and 10. As is clear from these Figures, a plurality of pins 95 join the two halves of the epitrochoidal race 10. These two halves are also joined by way of bridging piece 11 (forming the center of the "H" shaped cross section of the epitrochoidal races or gears). As seen in FIG. 10, for example, the bridging piece 11 is circumferentially segmented in order to allow the legs of the spider to pass therethrough.

Figure 11:
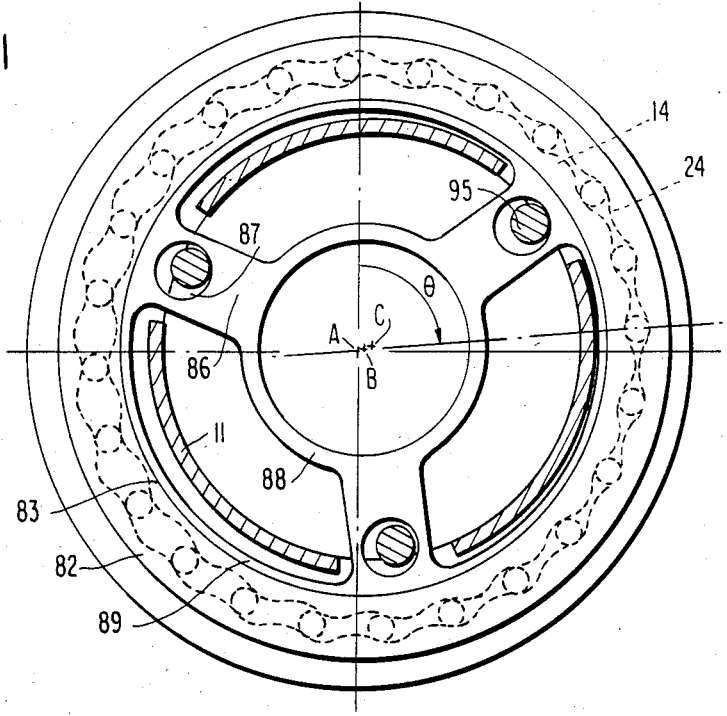

As can be seen from any of FIGS. 9 through 11, each leg of the spider is provided with an aperture 87 through which a pin 95 passes. The apertures 87 are substantially larger in diameter than the pins 95, inasmuch as the spider and the epitrochoidal race undergo different orbital motions.

That is, with respect to the central axis A, the roller center B and the center of the respective epitrochoidal gear C both revolve thereabout (as explained with respect to FIGS. 1-3). However, with rspect to the retainer structure, in particular, with respect to the spider center B, the epitrochoidal race center C appears to orbit about it (B) as well. Accordingly, the pin and hole connection between the epitrochoidal races and the spider 86 is sized so as to control the rotation of the spider and prevent the same from randomly impacting the epitrochoidal races, i.e., at the boundaries of the circumferentially segmented portions of the bridge 11.

The pin and hole connections between the spider and the epitrochoidal races are designed to operate in close proximity but not interfering so that there is no interference with the primary function of the control of the retainer proper via the cam 90. The actual load imposed upon the pins 95 is quite small, inasmuch as the spider is provided with bearings or bushings at both its internal and external circumferential peripheries (i.e., at the interfaces with the cam 90 and the retainers proper 82).

The actual configurations of the retainer cam or cams and the main cam 50 may be determined from the following formulae, which yield the eccentric distances from the center axis A.

$$\overline{AC} = \tfrac{1}{2}(1PE + 1/PH) \quad (3)$$

$$\overline{AB} = \tfrac{1}{2}(1/PH) \quad (4)$$

where:
$\overline{AC}$ is the epitrochoidal or main cam eccentricity,
$\overline{AB}$ is the retainer cam eccentricity,
PE is the theoretical pitch of the epitrochoidal races (both races have the same theoretical pitch) and
PH is the hypotrochoidal race theoretical pitch (again the same).

Figure 12:
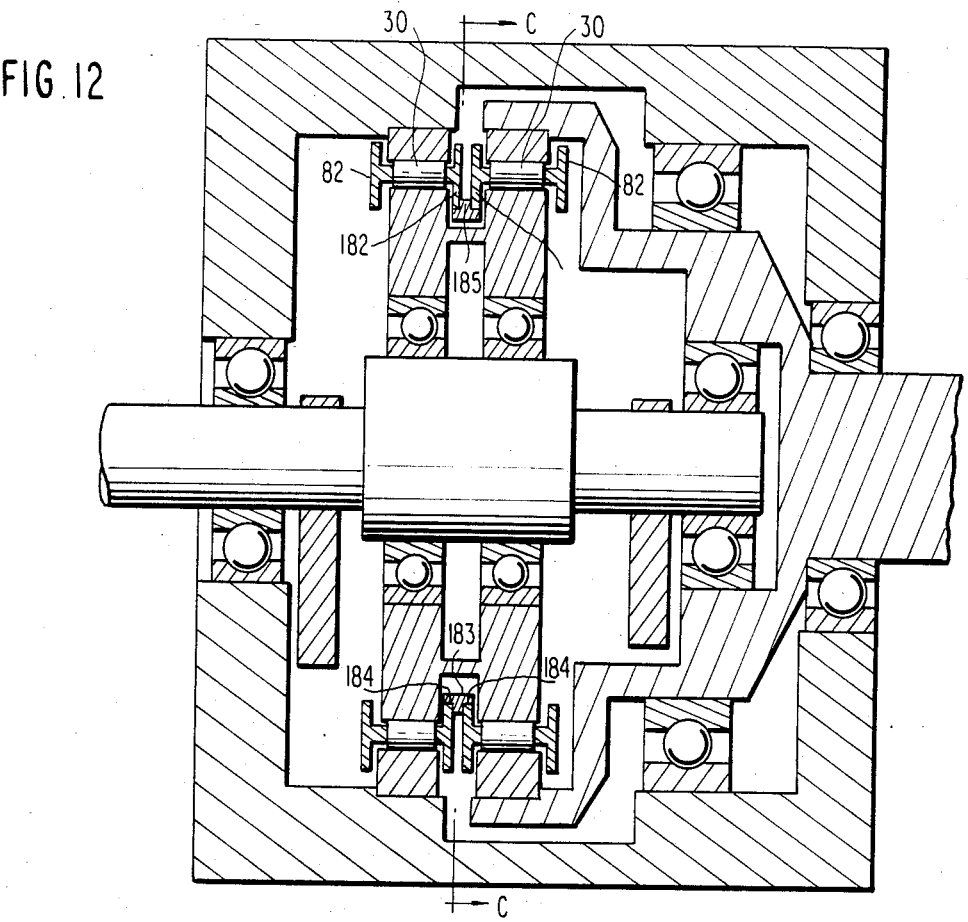
FIG. 12 illustrates a retainer control mechanism according to a third embodiment of the present invention.
Figure 13:
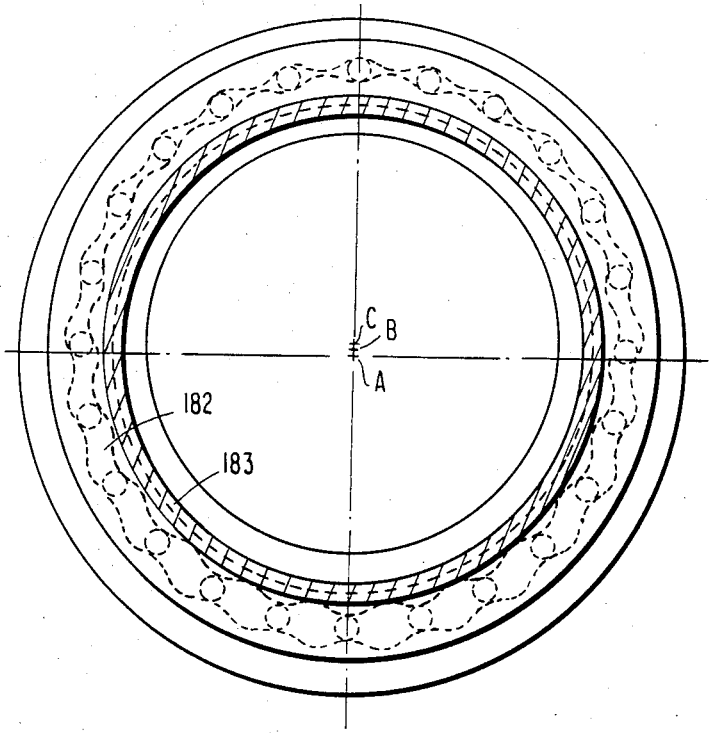
FIG. 13 illustrates a further view of the third embodiment, taken along line C—C of FIG. 12; and, FIG. 14 illustrates an actual transmission constructed according to the preferred second embodiment more schematically illustrated in FIGS. 8-11.

A third embodiment of the present invention is schematically illustrated in FIGS. 12 and 13. The structure of this embodiment differs from that of the previous embodiments in that the retainer structure is not directly driven by means of a cam or similar structure coacting with the input shaft. According to this embodiment, retainers 82 are provided for each set of rollers 30, and these two retainers are provided with inner flanges 182. The flanges 182 are supported by a single annular ring 183 having bearing or bushing structures 184 at the flange-ring interfaces. A protrusion 185 assists in seating the two retainers 82 and in maintaining the proper spacing therebetween.

With the structure of FIGS. 12 and 13, the two retainers are orbitally linked, but are allowed to rotate independently. That is, the ring 183 forces the two retainers 82 to remain in the same orbit, but allows independent rotational movement thereof. Thus, independent random motion of the retainers is prevented as the orbital linkage of the two retainers tends to average out motions which would otherwise occur with independent retainers. In tests performed on transmissions having retainer structures constructed according to this embodiment, smoother drive outputs have been obtained.

Figure 14:
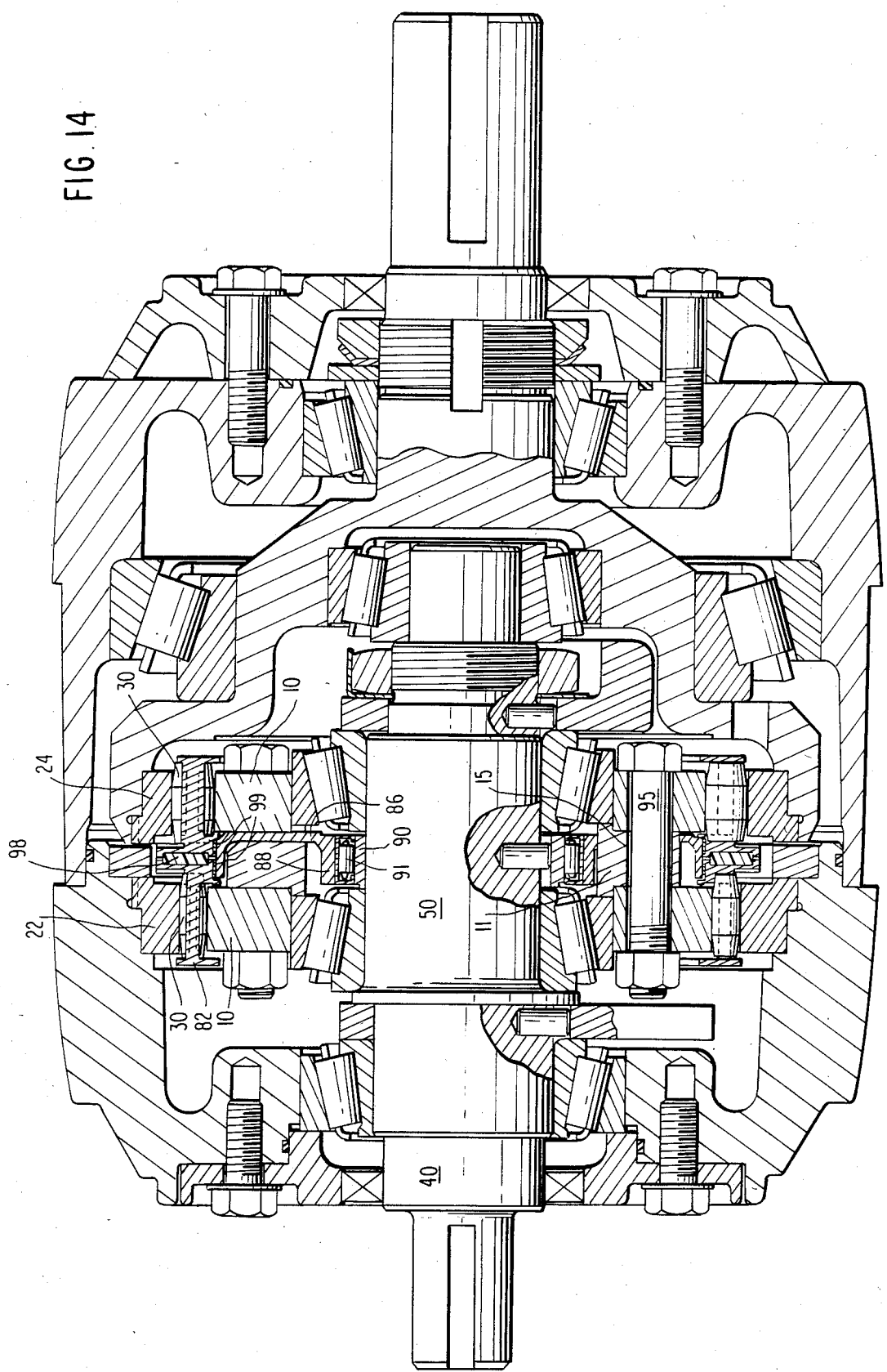

FIG. 14 illustrates an actual transmission constructed according to the second embodiment schematically illustrated in FIGS. 8-11. Input shaft 40 is bearingly supported within the transmission by tapered roller bearings or the like, and includes the cam portion 50 centrally thereof. The retainer cam 90 is non-rotatively supported on the main cam 50 by suitable means and is surrounded by a ring of roller or needle bearings 91. The spider member 86 is substantially C shaped in cross section, and bears upon the ring of bearings 91 at its inner ring portion 88.

The two epitrochoidal races 10 are held together by means of pins 95 having threaded ends for receiving clamping nuts. A spacer member 11 extends between the two epitrochoids 10 in the axial direction, and is clamped therebetween by means of the pins 95. As discussed below, the spacer member is provided with radial slots or recesses for receiving the legs of the spider 86.

Between the respective epitrochoidal races and stator hypotrochoidal race 22 and output hypotrochoidal race 24 are entrained two series of rollers 30 held by retainers proper 82. Centrally of the retainers 82 is provided bearing means 99 (typically a bushing) upon which the spider portion 86 bears to support the two retainer elements 82 and to cause the orbiting of the same. In this embodiment, the retainer spider 86 and the retainers proper 82 are thus capable of independent rotational motion. Further bearing means 98 (typically a bushing) is positioned between the two elements 82. The center spacer 11 includes a plurality of axially cut, radially extending recesses as indicated previously, for the passage of individual spider legs. Of course, as many recesses are provided as legs of the spider employed. The spacer 11 is also provided with axial bores 15 through which the pins 95 pass. The retainer spider 86 is driven by the pins 95 in the manner indicated above. That is, the legs of the spider 86 are provided with apertures 87 sized larger than the diameter of pins 95, so that the spider may be rotationally driven by the epitrochoidal races although it may be allowed to orbit independently thereof. The overall operation of the FIG. 14 device is of course identical to that of FIGS. 8-11, as the constituents of the drive are identical.

Although a plurality of embodiments of the present invention have been illustrated and described above, it will be appreciated by those skilled in the art that various additional modifications could be made to the illustrated devices in order to achieve the objects of this invention without departing from the scope and spirit thereof. It is intended to cover in the appended claims all such modifications as fall within the true spirit and scope of the invention.

I claim:

1. In an epicyclic speed reducing transmission of the type employing gear members having opposed gear surfaces with a plurality of rollers in rolling engagement with and transmitting torque between the same, the improvement comprising retainer means directly guiding said rollers, and cam means for orbitally driving said retainer means while said retainer means maintains said rollers in a circular array, said cam means being centered at the center of the circle defined by said rollers.

2. The apparatus as claimed in claim 1, wherein said retainer means comprises a pair of roller retainers connected for conjoint orbital movement and independent rotational movement, said roller retainers being spaced from one another by bearing means.

3. The apparatus as claimed in claim 1, wherein said cam means comprises a single cam element mounted between two axially adjacent gear members.

4. The apparatus as claimed in claim 1, wherein said cam means comprises a pair of cam elements mounted on either side of a pair of axially adjacent gear members.

5. The apparatus as claimed in claim 1, further including a driving cam for orbitally driving at least one gear member, said cam means being nonrotatively mounted on said drive cam.

6. The apparatus as claimed in claim 1, said retainer means comprising a pair of roller retainers for respectively guiding a set of rollers, said roller retainers being mounted for conjoint orbital and independent rotary motion.

7. The apparatus as claimed in claim 6, said retainer means further including follower means contacting said cam means, and radially extending connector means integral with said follower means and in sliding contact with said pair of roller retainers.

8. The apparatus as claimed in claim 7, including means for rotationally driving said connector means, said driving means comprising a plurality of pins torsionally connecting a pair of axially adjacent gear members, said pins passing through apertures formed in said connector means, whereby said connector means rotates with said gear members.

9. An apparatus as claimed in claim 1, wherein said opposed gear surfaces comprise conjugate epitrochoidal and hypotrochoidal races.

10. The apparatus as claimed in claim 1, wherein said gear members comprise at least two torsionally rigid epitrochoidal races, and wherein said retainer means includes a first portion in contact with said rollers, a second portion in contract with said cam means, and a third portion extending between said first and second portions.

11. The apparatus as claimed in claim 10, wherein said third portion of said retainer means comprises a connector fixedly engaged with said first portion and said second portion and arranged axially outwardly of said epitrochoidal races on either side thereof.

12. The apparatus as claimed in claim 10, wherein said third portion comprises a plurality of legs integral with said second portion and in sliding contact with said first portion of said retainer.

13. The apparatus as claimed in claim 10, wherein said first portion comprises a pair of bearingly supported roller retainers, one for each of two conjugate hypotrochoidal-epitrochoidal gear pairs.

14. The apparatus as claimed in claim 10, wherein said first portion comprises a pair of roller retainers, and further including bearing means between said pair of roller retainers, and between said roller retainers and said third portion.

15. In an epicyclic speed reducing transmission of the type employing opposed gear surfaces with a plurality of rollers in rolling engagement with and transmitting torque between the same, the improvement comprising retainer means for guiding said rollers, said retainer means including a pair of roller retainers and means for joining said roller retainers for conjoint orbital and independent rotary motion.

16. The apparatus as claimed in claim 15, wherein said joining means comprises an annular ring orbitally linking said pair of roller retainers and including bearing means for rotationally supporting each said roller retainer.

17. An apparatus as claimed in claim 15, wherein said opposed gear surfaces comprise conjugate epitrochoidal and hypotrochoidal races.

* * * * *